(12) United States Patent
Wabe et al.

(10) Patent No.: US 9,566,524 B2
(45) Date of Patent: Feb. 14, 2017

(54) INFORMATION-PROCESSING DEVICE, INFORMATION-PROCESSING SYSTEM, INFORMATION-PROCESSING METHOD, AND COMPUTER-READABLE STORAGE MEDIUM, FOR DOWNLOADING DATA

(71) Applicant: NINTENDO CO., LTD., Kyoto (JP)

(72) Inventors: Kazuhiro Wabe, Kyoto (JP); Teruhiko Goda, Kyoto (JP); Eiji Tokunaga, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 422 days.

(21) Appl. No.: 13/677,699

(22) Filed: Nov. 15, 2012

(65) Prior Publication Data

US 2013/0123022 A1     May 16, 2013

(30) Foreign Application Priority Data

Nov. 15, 2011  (JP) ................................ 2011-250146

(51) Int. Cl.
*G06F 15/16* (2006.01)
*A63F 13/77* (2014.01)
(Continued)

(52) U.S. Cl.
CPC ............... *A63F 13/77* (2014.09); *A63F 13/12* (2013.01); *A63F 13/75* (2014.09); *A63F 13/352* (2014.09);
(Continued)

(58) Field of Classification Search
CPC .... A63F 13/12; A63F 13/10; A63F 2300/554; A63F 2300/552; A63F 2300/407; A63F 2300/5593; A63F 2300/534; A63F 2300/535; H04W 4/26
(Continued)

(56) References Cited

U.S. PATENT DOCUMENTS

| 7,003,554 | B1 * | 2/2006 | Turner ................... H04L 67/02 709/217 |
| 7,275,994 | B2 * | 10/2007 | Eck ......................... A63F 13/02 463/40 |

(Continued)

FOREIGN PATENT DOCUMENTS

| JP | 2002-232594 | 8/2002 |
| JP | 2004-328239 | 11/2004 |

(Continued)

OTHER PUBLICATIONS

"Nintendo eShop", http://www.nintendo.co.jp/3ds/eshop/index.html and its English counterpart http://www.nintendo.com/3ds/downloads, 4 pgs., printed Nov. 11, 2012.

(Continued)

*Primary Examiner* — Tauqir Hussain
*Assistant Examiner* — Kamran Mohammadi
(74) *Attorney, Agent, or Firm* — Nixon & Vanderhye P.C.

(57) ABSTRACT

An exemplary information-processing device includes: a switching unit configured to switch an operating mode of the information-processing device to an active mode or a sleep mode; a receiving unit configured to receive, when the information-processing device is in the active mode, an instruction to download data specified by a user; and a downloading unit configured to start download of the data when the operating mode of the information-processing device is switched from the active mode to the sleep mode.

18 Claims, 12 Drawing Sheets

(51) Int. Cl.
*A63F 13/75* (2014.01)
*A63F 13/30* (2014.01)
*A63F 13/352* (2014.01)
*A63F 13/92* (2014.01)

(52) U.S. Cl.
CPC .......... *A63F 13/92* (2014.09); *A63F 2300/204* (2013.01); *A63F 2300/403* (2013.01); *A63F 2300/407* (2013.01); *A63F 2300/534* (2013.01); *A63F 2300/552* (2013.01); *A63F 2300/5513* (2013.01)

(58) Field of Classification Search
USPC .................................. 455/574; 713/320, 323
See application file for complete search history.

(56) References Cited

U.S. PATENT DOCUMENTS

| | | | | |
|---|---|---|---|---|
| 8,081,596 | B1* | 12/2011 | Buracchini | H04W 8/245 370/328 |
| 8,245,062 | B1 | 8/2012 | Nanda | G06F 1/3228 713/300 |
| 2002/0010789 | A1* | 1/2002 | Lord | 709/231 |
| 2002/0052925 | A1* | 5/2002 | Kim | H04L 29/06 709/217 |
| 2004/0117839 | A1* | 6/2004 | Watson | H04L 29/06027 725/87 |
| 2004/0209569 | A1* | 10/2004 | Heinonen et al. | 455/41.2 |
| 2004/0214599 | A1 | 10/2004 | Ogino | |
| 2006/0069769 | A1* | 3/2006 | Dacosta | H04L 29/06027 709/224 |
| 2006/0150020 | A1* | 7/2006 | Lee | G06F 1/3203 714/36 |
| 2008/0171600 | A1* | 7/2008 | Ostergren | A63F 13/12 463/42 |
| 2009/0111510 | A1* | 4/2009 | Ono | 455/552.1 |
| 2009/0143114 | A1* | 6/2009 | Vargas | H04W 52/027 455/574 |
| 2010/0023665 | A1* | 1/2010 | Horikawa et al. | 710/115 |
| 2010/0056272 | A1* | 3/2010 | Dutilly et al. | 463/30 |
| 2010/0095144 | A1* | 4/2010 | Yamanaka | A63F 13/10 713/323 |
| 2010/0325234 | A1* | 12/2010 | Hiroki | 709/207 |
| 2010/0333085 | A1* | 12/2010 | Criddle et al. | 717/178 |
| 2011/0022719 | A1* | 1/2011 | Anderson et al. | 709/231 |
| 2011/0055434 | A1* | 3/2011 | Pyers et al. | 710/14 |
| 2011/0246637 | A1* | 10/2011 | Murakami | 709/223 |
| 2011/0268425 | A1* | 11/2011 | Glen | 386/272 |
| 2012/0157166 | A1* | 6/2012 | Kim | G06F 21/6218 455/566 |

FOREIGN PATENT DOCUMENTS

| | | |
|---|---|---|
| JP | 2008-512944 | 4/2008 |
| JP | 2011-193163 | 9/2011 |
| WO | WO 2006/031382 | 3/2006 |
| WO | WO 2009/037786 | 3/2009 |

OTHER PUBLICATIONS

"Nintendo DSi", http://www.nintendo.co.jp/ds/series/dsi/menu/shop/index.html and its English counterpart http://www.nintendo.com/consumer/systems/dsi/en_na/shop.jsp, 4 pgs., printed Nov. 9, 2012.
"Nintendo Zone", http://www.nintendo.co.jp/ds/nintendozone/index.html and its English counterpart http://www.nintendo.com/3ds/nintendozone, 4 pgs., printed Nov. 9, 2012.
"Big Mac is Free?", http://trendy.nikkeibp.co.jp/article/column/20090622/1027204/?P=4 and its Concise Explanation of relevance, 4 pgs., printed Sep. 12, 2012.
European Search Report issued Application No. 12192550.7 dated Sep. 11, 2015.
Japanese Office Action issued in Application No. 2011-250146 dated Dec. 8, 2016 w/ translation.
Extended European Search Resort issued in EP App. No. 12192550.7 dated Jan. 20, 2016.

* cited by examiner

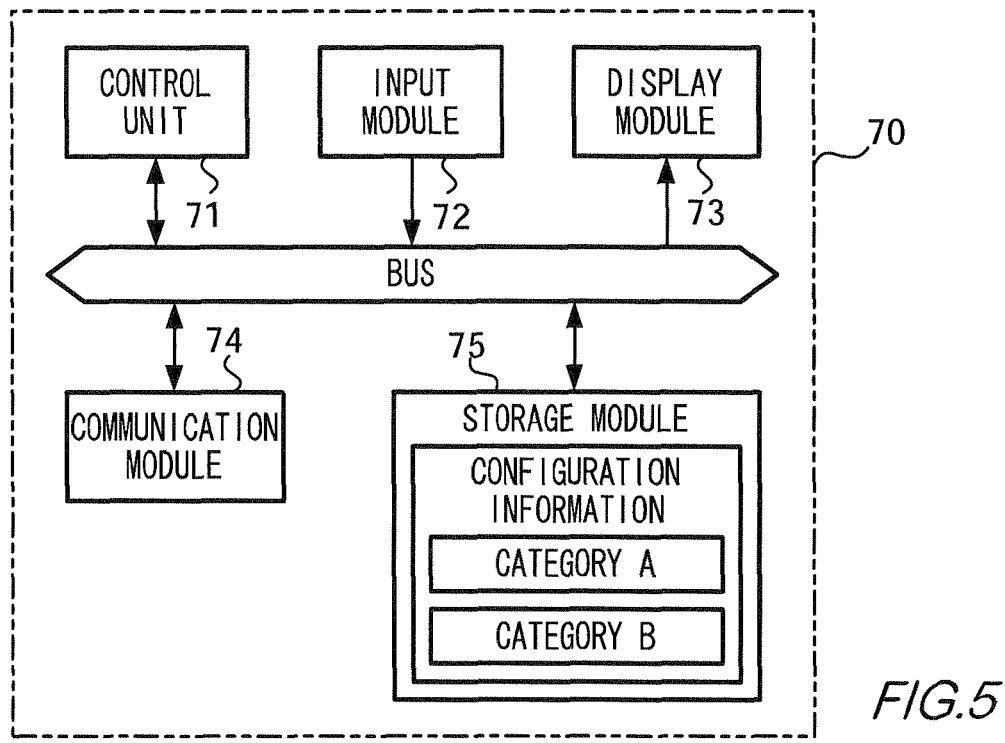

INFORMATION-PROCESSING DEVICE, INFORMATION-PROCESSING SYSTEM, INFORMATION-PROCESSING METHOD, AND COMPUTER-READABLE STORAGE MEDIUM, FOR DOWNLOADING DATA

CROSS REFERENCE TO RELATED APPLICATIONS

This application is based on and claims a priority under 35 USC 119 from Japanese patent application No. 2011-250146, which was filed on Nov. 15, 2011.

FIELD

The technology herein relates to downloading data.

BACKGROUND AND SUMMARY

Video game devices to which a storage medium such as a memory card storing an application program such as game software is attached are in widespread use. Recently, devices that can download a video game application program from a server via a network, instead of using a storage medium, have become increasingly popular.

By the present disclosure, restriction of usage of an information-processing device caused by a download is prevented.

There is provided an information-processing device including: a switching unit configured to switch an operating mode of the information-processing device to an active mode or a sleep mode; a receiving unit configured to receive, when the information-processing device is in the active mode, an instruction to download data specified by a user; and a downloading unit configured to start download of the data when the operating mode of the information-processing device is switched from the active mode to the sleep mode.

BRIEF DESCRIPTION OF THE DRAWINGS

Exemplary embodiments will be described with reference to the following drawings, wherein:

FIG. 5 shows an example of a hardware configuration of configuration server 70;

FIGS. 6A and 6B show an example of configuration information;

DETAILED DESCRIPTION OF NON-LIMITING EXEMPLARY EMBODIMENTS

1. Configuration 1-1. Information-Processing System 1

Figure 1:
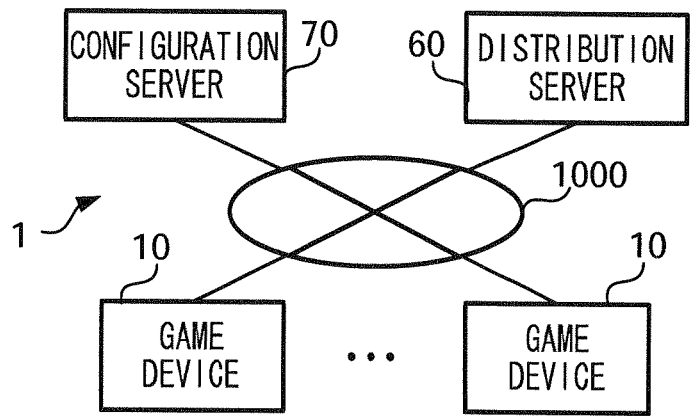
FIG. 1 shows an example of a configuration of information-processing system 1.

FIG. 1 shows an example of a configuration of information-processing system 1 according to one exemplary embodiment. Information-processing system 1 includes game device 10, distribution server 60, and configuration server 70. Plural game devices 10, distribution server 60, and configuration server 70 are interconnected via a network 1000 such as the Internet. A unique device ID is allocated to each of plural game devices 10. Distribution server 60 and configuration server 70 identify one game device 10 to which the server is connected, by the device ID added to communicated data. It is to be noted that game device 10 is an example of an information-processing device. The information-processing device may be a personal computer, a PDA (Personal Digital Assistant), a mobile phone, a smartphone, or a tablet device.

First, an outline of operations in information-processing system 1 will be described. Game device 10 provides information relating to applications such as game software that can be provided by distribution server 60, based on configuration information (refer to FIGS. 6A and 6B) received from configuration server 70. The information is categorized. A user buys, by operating game device 10, an application after referring to the provided information. If the user buys an application, game device 10 downloads an application program corresponding to the bought application. It is to be noted that, in configuration server 70, the configuration information is updated by a service provider, for example.

1-2. Hardware Configuration 1-2-1. Game Device 10

Figure 2A:
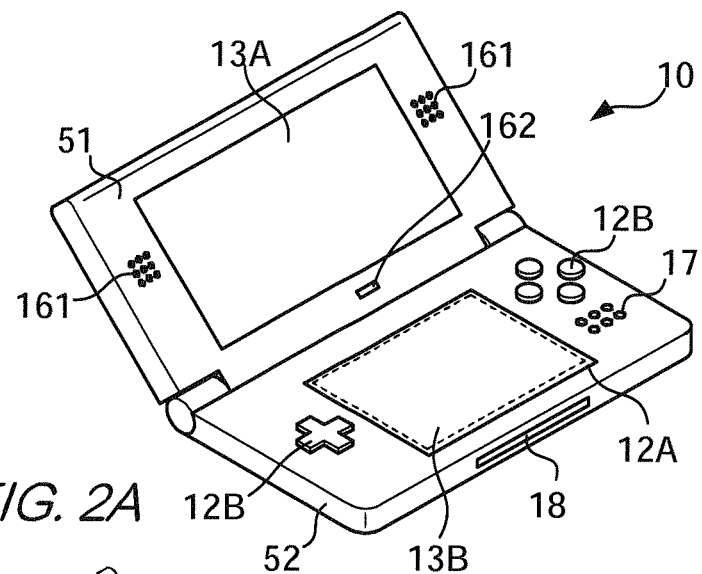
FIGS. 2A and 2B each show an example of an appearance of game device 10.
Figure 2B:
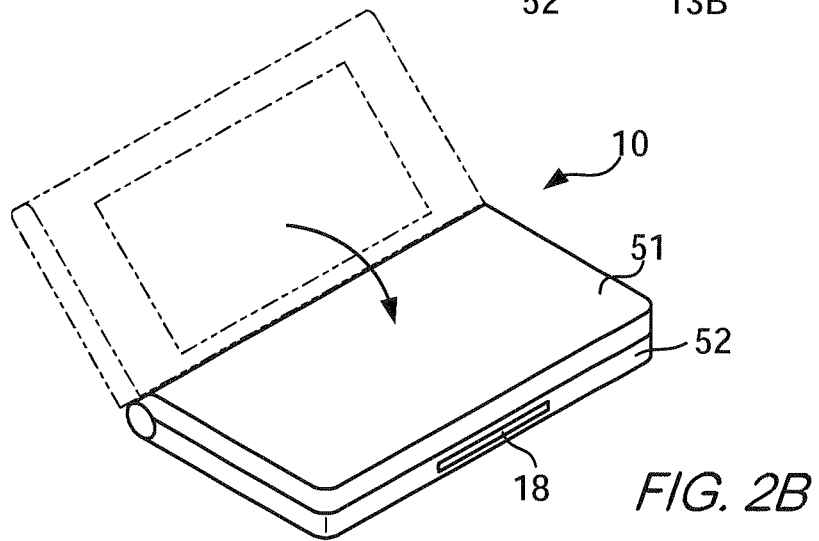

FIGS. 2A and 2B each show an example of an appearance of game device 10. A body of game device 10 includes upper body 51 and lower body 52. A user can open and close the device. FIG. 2A shows game device 10 when open. FIG. 2B shows game device 10 when closed.

Upper body 51 includes upper screen 13A, speaker 61, and microphone 162. Lower body 51 includes lower screen 13B having touch sensor 12A on its surface, buttons 12B, sensor 17, and interface 18. When game device 10 is closed, a user cannot operate touch sensor 12A or buttons 12B because touch sensor 12A and buttons 12B are located between upper body 51 and lower body 51, as shown in FIG. 2B.

Figure 3:
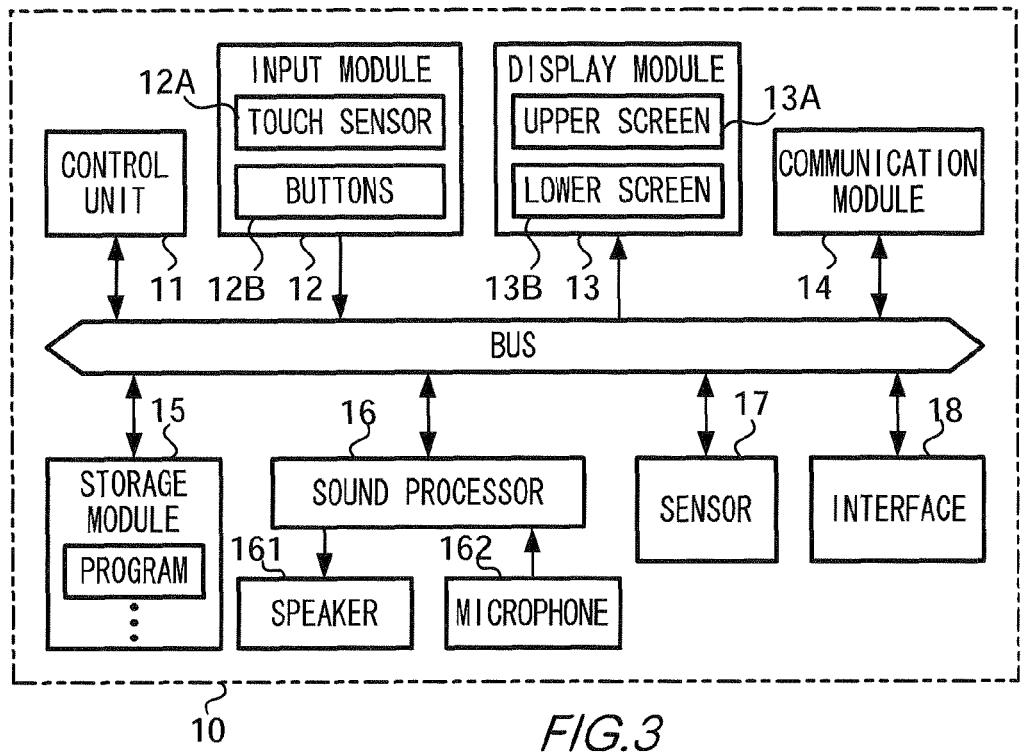
FIG. 3 shows an example of a hardware configuration of game device 10.

FIG. 3 shows an example of a hardware configuration of game device 10. Game device 10 is an information-processing device including control unit 11, input module 12, display module 13, communication module 14, storage module 15, sound processor 16, sensor 17, and interface 18. These elements are connected via a bus. Further, game device 10 includes speaker 61 and microphone 162 connected to sound processor 16.

Control unit 11 includes a CPU (Central Processing Unit), a RAM (Random Access Memory), and a ROM (Read Only Memory). The CPU executes a program stored in the ROM, storage module 15, or a storage medium connected to interface 18, so as to implement the functions described later. The RAM functions as a work area for the CPU executing a program.

Input module 12 includes touch sensor 12A and buttons 12B to receive an input from a user, and outputs the received information to control unit 11. Accordingly, a user can input an instruction to game device 10. Hereinafter, an instruction by a user refers to an instruction input via input module 12.

Display module 13 includes upper screen 13A and lower screen 13B. Each of upper screen 13A and lower screen 13B is a display device such as a liquid crystal display device, and displays an image under the control of control unit 11. The image displayed on upper screen 13A and lower screen 13B shows various images depending on an executed program; for example, a menu image or an image for setting configurations.

Communication module 14 communicates data via network 1000 to distribution server 60 or configuration server 70, under the control of control unit 11.

Storage module 15 includes, for example, a non-volatile memory and stores various programs and data. The stored programs include a program for buying a content (hereinafter referred to as a "buying program" and an application program downloaded via the network.

Microphone 162 receives a user's voice and outputs to sound processor 16 an electronic signal corresponding to the input user's voice. Speaker 61 changes the electronic signal output from sound processor 16 into sound, and outputs the sound. Sound processor 16 includes a signal processor such as a DSP (Digital Signal Processor). Sound processor 16 converts an electronic signal input by microphone 162, from analog to digital, and outputs the converted signal to control unit 11. Sound processor 16 processes data output from control unit 11 by an effect process set by control unit 11, a process for converting a digital signal to an analog signal (D/A converting), a process for amplifying, and so on. Sound processor 16 outputs an electronic signal showing the processed data, to speaker 61.

Sensor 17 is a sensor for detecting whether game device 10 is open (as shown in FIG. 2A), or closed (as shown in FIG. 2B). Sensor 17 outputs a signal showing the detected results, to control unit 11. In this example, sensor 17 is a magnet sensor. Sensor 17 is installed at a position where sensor 17 receives a magnetic field from a magnet used in speaker 61 at upper body 51 when the body is closed. Sensor 17 detects whether game device 10 is closed or open by magnitude of the magnetic field.

Interface 18 is an interface to which an external device is connected, and relays data between the external device and game device 10. The external device is, for example, a storage medium that stores an application program.

1-2-2. Distribution Server 60

Figure 4:
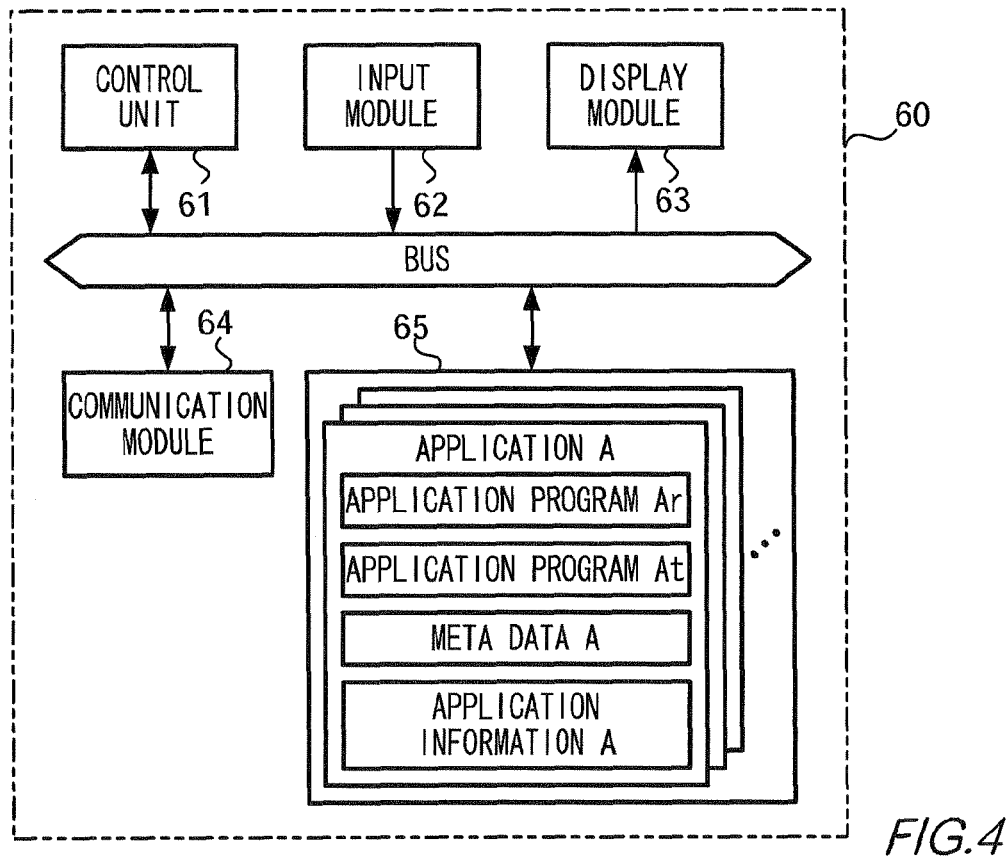
FIG. 4 shows an example of a hardware configuration of distribution server 60.

FIG. 4 shows an example of a hardware configuration of distribution server 60. Distribution server 60 includes control unit 61, input module 62, display module 63, communication module 64, and storage module 65. These elements are connected via a bus.

Control unit 61 includes a CPU, a RAM, and a ROM. The CPU executes a program stored in the ROM or storage module 65, to implement functions to be described later. The RAM functions as a work area for the CPU executing a program.

Input module 62 includes a keyboard and/or a mouse for receiving an input by a user, and outputs to control unit 61 information showing the received input. Display module 63 includes a display device such as a liquid crystal display, and displays an image under the control of control unit 61.

Communication module 64 communicates data with game device 10 via network 1000, under the control of control unit 11. Further, communication module 64 receives an application program and related information from an external device (not shown in the figures) that is used by a service provider. The received application program and the related information are stored in storage module 65, under the control of control unit 61.

Storage module 65 includes, for example, a hard disk drive or a non-volatile memory. Storage module 65 stores information relating to content. The information relating to content includes, retail version application program a trial version application program, meta data, and application information. Storage module 65 stores applications A, B, C, . . . as contents and information corresponding to the contents, for each of the applications. For example, for application A, application program Ar (retail version application program), application program At (trial version application program), meta data A, and application information A, are stored in storage module 65 with their relationships. A trial version application program may not exist The meta data is attached to the application program and shows, for example, a title of the content (a name of the application program), a date of release (a date on which download of the content is available), a type of the content (for example, game software, movie, and so on), and a price. It is to be noted that if the type of the application program is a movie, the application program may be a program for playing the movie. Alternatively, the content may be movie data that can be played using a native function of game device 10.

The application information is information relating to the application program, for example, an icon image for identifying the application program, or a description of the application program.

1-2-3. Configuration Server 70

FIG. 5 shows an example of a hardware configuration of configuration server 70. Configuration server 70 includes control unit 71, input module 72, display module 73, communication module 74, and storage module 75. These elements are interconnected via a bus.

Control unit 71 includes a CPU, a RAM, and a ROM. The CPU executes a program stored in the ROM or storage module 75, to implement functions to be described later. The RAM functions as a work area used by the CPU executing a program.

Input module 72 includes an input device such as a keyboard or a mouse. Input module 72 receives an input from a user and outputs to control unit 71 information showing the input. Display module 73 includes a display device such as a liquid crystal display, and displays an image under the control of control unit 71.

Communication module 74 communicates data with game device 10 via network 1000 under the control of control unit 71.

Storage module 75 includes a storage device such as a hard disk drive or a non-volatile memory, and stores configuration information.

FIGS. 6A and 6B show an example of configuration information. The configuration information is information defining a category (category A shown in FIG. 6A) to which a search condition is related, and a category (category B shown in FIG. 6B) to which a content is related.

The search condition defined in category A is used for a search with the meta data, and defines a character string included in a title of the content a period during which the content is released, and a type of the content. In the search, contents whose meta data satisfies the search condition are listed as search results. In an example shown in FIG. 6A, a search condition a is defined for category A1. In a case that search condition a defines "title: ABC," contents whose title includes a character string "ABC" are listed among the search results.

Contents defined by category B correspond to at least a part of the contents stored in storage module 65 of distribution server 60. In an example shown in FIG. 6B, category B1 defines application program A, C, F, . . . .

The search condition and contents related to the category can be updated according to an instruction input from input module 72 or an external device (not shown in the figures) used by a service provider.

1-3. Functional Configuration 1-3-1. Searching

Figure 7:
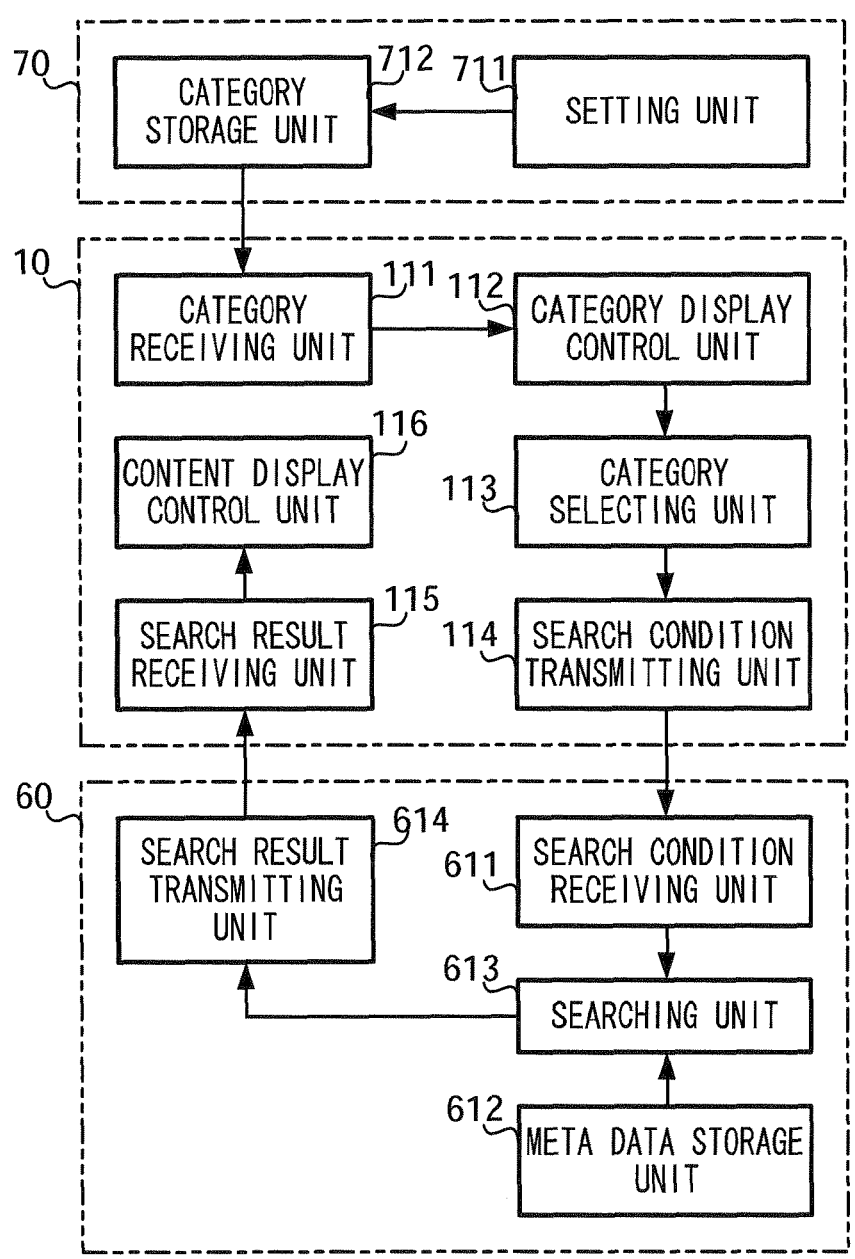
FIG. 7 shows an example of a functional configuration for searching.

FIG. 7 shows an example of a functional configuration for searching. Game device 10 includes category receiving unit 111, category display control unit 112, category selecting unit 113, search condition transmitting unit 114, search result receiving unit 115, and content display control unit 116. Distribution server 60 includes search condition receiving unit 611, meta data storage unit 612, searching unit 613, and search result transmitting unit 614. In this case, distribution server 60 functions as a searching device. Configuration server 70 includes setting unit 711 and category storage unit 712. In this case, configuration server 70 functions as a condition setting device. It is to be noted that searching and condition setting may be implemented by a single device.

Setting unit 711 receives an instruction from a service provider via input module 72 or an external device via communication module 74, and updates the configuration information. Category storage unit 712 stores configuration information showing a category defining a search condition (category A), and a category relating to a content (category B). Category B may be omitted.

Category receiving unit 111 receives configuration information including a category and a search condition defined by the category, stored in category storage unit 712, and stores the received configuration information in the RAM in control unit 11. The stored configuration information is updated when category receiving unit 111 receives the latest configuration information. Category display control unit 112 controls display module 13 to display at least one category included in the configuration information (refer to FIG. 11). Category selecting unit 113 selects one category from among categories displayed on display module 13, in response to an instruction by a user. If category A is selected, search condition transmitting unit 114 determines the search condition defined by the selected category based on the configuration information stored in the RAM, and transmits the search condition to distribution server 60.

Search condition receiving unit 611 receives the search condition from game device 10. Meta data storage unit 612 stores the meta data. Searching unit 613 searches for (or identifies) contents that satisfy the received search condition, with reference to the meta data. Search result transmitting unit 614 transmits to game device 10 the search results by searching unit 613. In this example, the search results include application information corresponding to the identified contents. For example, if applications A and B are identified as contents corresponding to the category, application information A and B is transmitted.

Search result receiving unit 115 receives the search results from distribution server 60. Content display control unit 116 displays application information corresponding to the contents identified by searching unit 613, based on the search results received by search result receiving unit 115 (refer FIG. 12).

1-3-2. Downloading

Figure 8:
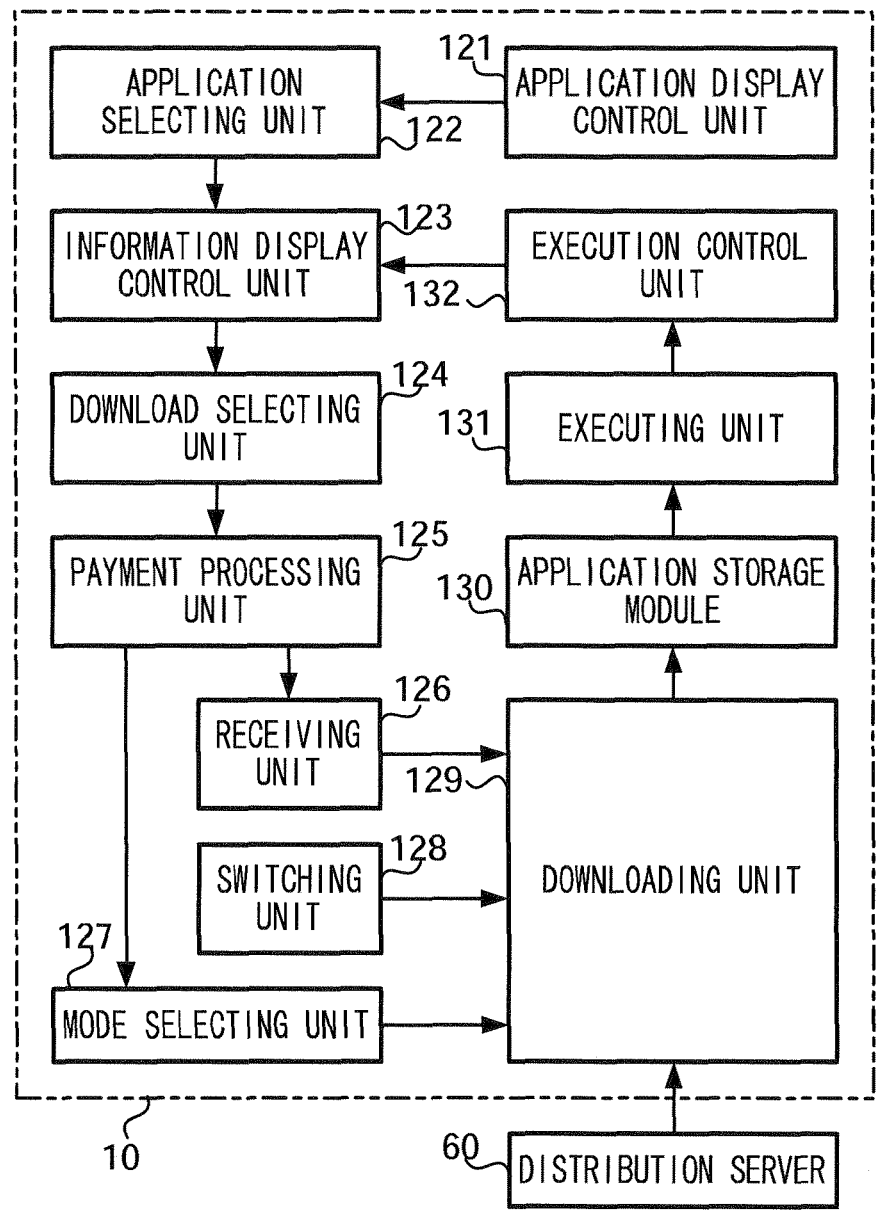
FIG. 8 shows an example of a functional configuration for downloading.

FIG. 8 shows an example of a functional configuration for downloading. Game device 10 includes application display control unit 121, application selecting unit 122, information display control unit 123, download selecting unit 124, payment processing unit 125, receiving unit 126, mode selecting unit 127, switching unit 128, downloading unit 129, application storage module 130, executing unit 131, and execution control unit 132. The download is referred to as "DL" in the figures.

Application display control unit 121 corresponds to content display control unit 116, and displays plural items of application information on display module 13. Application selecting unit 122 selects one item of application information from among plural items of application information displayed on display module 13, based on an instruction by a user. Information display control unit 123 displays on display module 13 related information corresponding to the selected item of the application information. In this example, the related information includes icon images showing a retail version application program and a trial version application program, corresponding to this application information (refer to FIG. 13). The related information may include description of contents corresponding to the application information. Download selecting unit 124 (DL selecting unit) selects a content to be downloaded based on an instruction by a user, in this case, the retail version application program or the trial version application program.

Payment processing unit 125 executes a process for paying for the application program downloaded into game device 10, with credit card information. Receiving unit 126 receives an instruction to download the program, for which the process for payment is completed. It is to be noted that the downloaded content may not be an application program and may be movie data or music data. In other words, the downloaded data need not be a program, as long as the data is identified by an instruction by a user.

Figure 14:
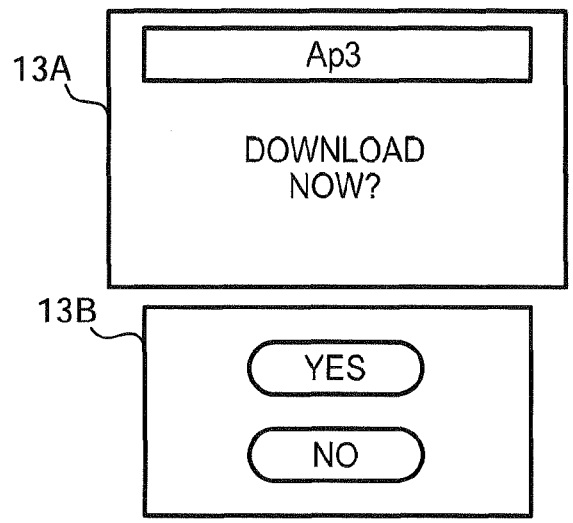
FIG. 14 is an example of a receiving mode selecting image in game device 10.

Mode selecting unit 127 selects a mode for downloading the selected application program, according to an instruction by a user (refer to FIG. 14). The mode is selected from a normal mode and a background mode. Switching unit 128 switches operation mode of game device 10 to one of an active mode and a sleep mode. The active mode is a mode in which game device 10 receives an instruction by a user via input module 12. The sleep mode is a mode in which game device 10 restricts receiving an instruction by a user via input module 12, compared with the active mode. In this example, switching unit 128 switches the operation mode of game device 10 to the active mode when game device 10 is open, and to the sleep mode when game device 10 is closed.

It is to be noted that to restrict receiving an instruction by a user is not necessarily to prevent receipt of any instruction, and may include receiving a part of instructions by a user. The sleep mode is not restricted to a mode in which game device 10 is closed. The sleep mode may be a mode in which power usage is reduced, the screen is off, or operational availability of the CPU is reduced. In such a case, the body may be open. Further, in such a case, although input via input module 12 is restricted in the sleep mode, an instruction for switching the operation mode to the normal mode may be input via input module 12.

Switching unit 128 may switch the operation mode from the normal mode to the sleep mode when no instruction is input via input module 12 for a predetermined duration or no application program is executed for a predetermined duration.

Downloading unit (DL unit) 129 downloads from distribution server 60 to game device 10 an application program for which an instruction to download is received by receiving unit 126. Here, if mode selecting unit 127 selects the normal mode, downloading unit 129 starts the downloading independent from the operation mode (the active mode or the sleep mode) of game device 10. On the contrary, if mode selecting unit 127 selects the background mode and the operation mode is the active mode, downloading unit 129 restricts the downloading. If the operation mode is switched from the active mode to the sleep mode, downloading unit 129 starts the downloading. If the operation mode is switched from the sleep mode to the active mode after the downloading is started, downloading unit 129 stops (restricts) the downloading. In this example, to restrict the downloading is to stop the downloading. Alternatively, to restrict the downloading may be to decrease the download rate, whereby a load on the processing capacity of the CPU is decreased.

Application storage module 130 stores an application program that is downloaded by downloading unit 129. Executing unit 131 executes an application program that is designated by a user, from among application programs stored in application storage module 130. If the application executed by executing unit 131 is the trial version application program, execution control unit 132 displays an image (refer to FIG. 17) to prompt a user to select whether to buy the application program. If an instruction to buy the retail version application program is input by the user, execution control unit 132 stop executing the trial version application program, and controls information display control unit 123 to display the related information (refer to FIG. 13). In such a case, information display control unit 123 displays the related information of the application information corresponding to the executed trial version application program.

2. Operation

The description will be given for an operation of game device 10. It is to be noted that the configuration information in configuration server 70 is determined by the service provider prior to the operation described below.

Figure 9:
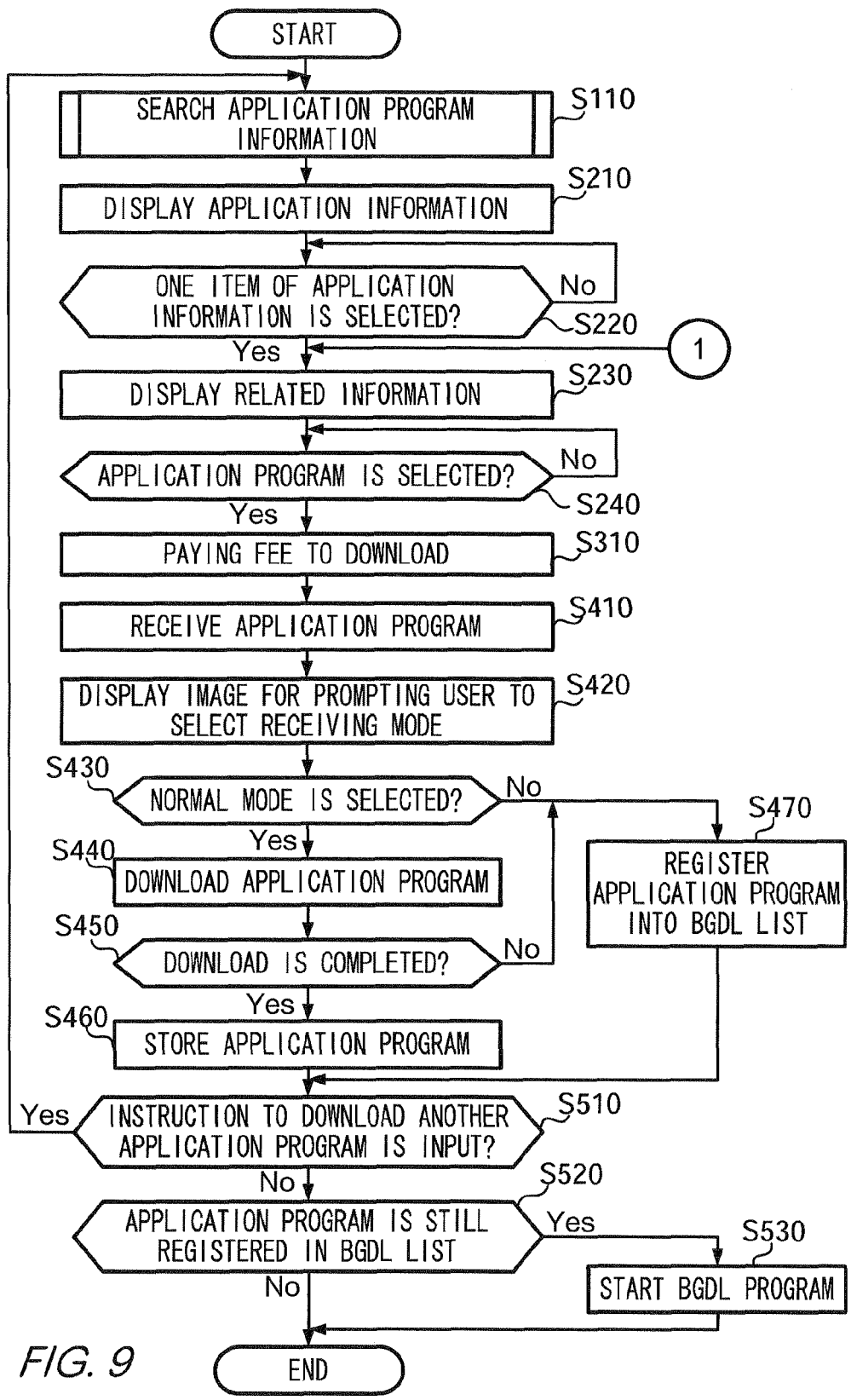
FIG. 9 shows an example of a flowchart illustrating a process for buying a content.

FIG. 9 shows an example of a flowchart illustrating a process for buying a content. If a user inputs an instruction to start an application program in game device 10, control unit 11 starts searching (step S110) application information.

Figure 10:
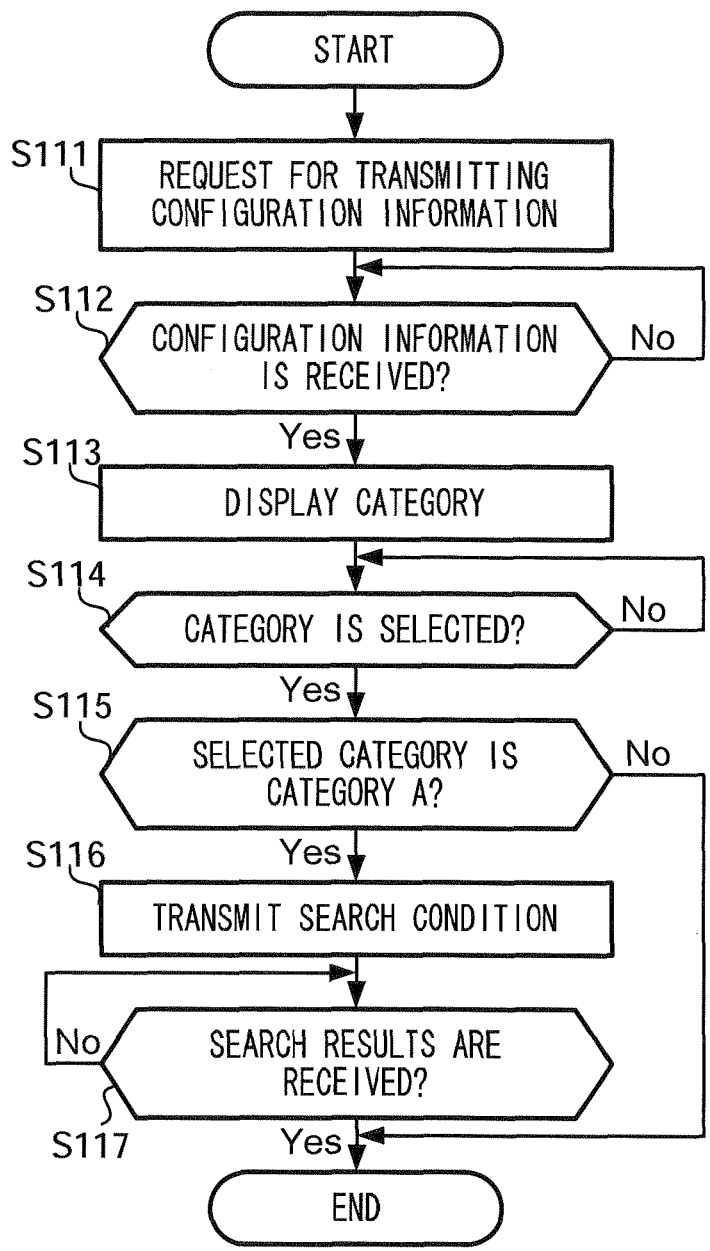
FIG. 10 shows an example of a flowchart illustrating a process for searching for application information.

FIG. 10 shows an example of a flowchart illustrating a process for searching the application information. Control unit 11 transmits (in step S111) to configuration server 70 via communication module 14 a request for transmitting the configuration information. Category receiving unit 111 waits (in step S112: NO) for receiving the configuration information stored in category storage unit 712 of configuration server 70. If category receiving unit 111 receives the configuration information (in step S112: YES), category display control unit 112 controls display module 13 to display (in step S113) on display module 13 a category based on the configuration information. Hereinafter, the displayed image including the category is referred to as a "category image".

Figure 11:
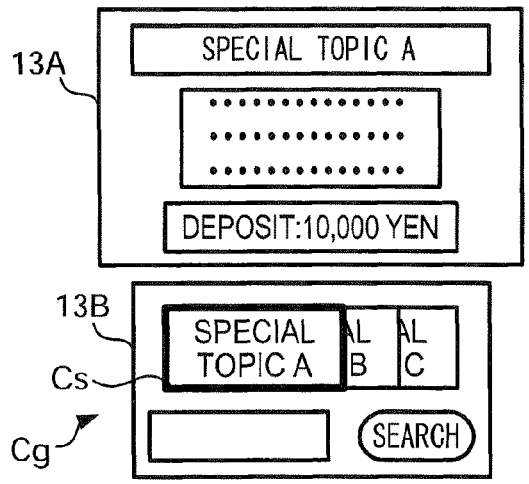
FIG. 11 shows an example of a category image in game device 10.

FIG. 11 shows an example of the category image in game device 10. In this example, category display control unit 112 displays on lower screen 13B icons Cg each showing a category included in the configuration information, and cursor Cs for selecting one icon from among icons Cg. Further, category display control unit 112 displays on upper screen 13A information relating to the category corresponding to the selected icon Cg. The information relating to the category and shown on upper screen 13A may be included in the configuration information.

In this example, a category may be "new arrival," "high ranked," "special topic A," or "special topic B."

Referring to FIG. 10 again, category selecting unit 113 waits (in step S114: NO) for an instruction by a user to select a category, while an image shown in FIG. 11 is displayed. If the user inputs an instruction (in step S114: YES), category selecting unit 113 selects one category based on the instruction. If the selected category is category A, for which the search condition is set (in step S115: YES), search condition transmitting unit 114 transmits (in step S116) to distribution server 60 a search condition set for the selected category. Search result receiving unit 115 waits (in step S117: NO) for receiving the search results from distribution server 60.

Distribution server 60 transmits to game device 10 the search results obtained by using search condition receiving unit 611, meta data storage unit 612, searching unit 613, and search result transmitting unit 614. The search results are obtained with the search condition transmitted from game device 10. In this example, the search results include the application information corresponding to contents that satisfy the search condition.

If search result receiving unit 115 receives the search results from distribution server 60 (in step S117: YES), content display control unit 116 controls display module 13 to display (in step S210 in FIG. 9) the application information included in the search results. Hereinafter, the image displayed in step S210 is referred to as an "application information image."

If category selecting unit 113 selects in step S115 category B, to which a content corresponds (in step S115: NO), content display control unit 116 controls display module 13 to display (in step S210 in FIG. 9) the application information based on the content corresponding to the selected category. Here, the application information may be received from distribution server 60, or may be received from configuration server 70 along with the configuration information.

Figure 12:
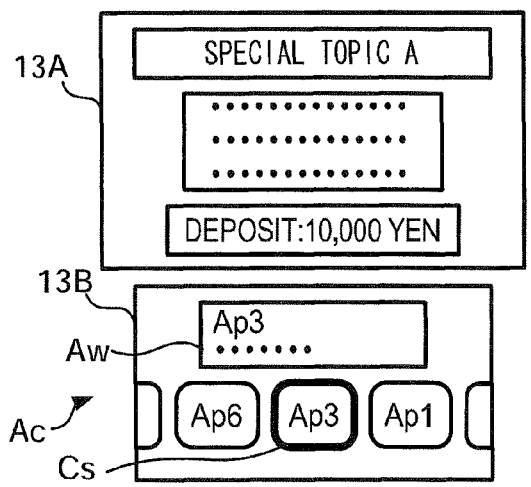
FIG. 12 shows an example of application information image in game device 10.

FIG. 12 shows an example of the application information image in game device 10. In this example, content display control unit 116 displays on lower screen 13B the contents identified as the search results in a case that category A is selected, or icons Ac corresponding to the contents corresponding to the category in a case that category B is selected. Further, content display control unit 116 displays cursor Cs for selecting one content. Still further, content display control unit 116 displays on window Aw a description of the content corresponding to the selected icon Ac. Thus, the application information of the contents corresponding to the category is displayed on lower screen 13B. Information related to the selected category is displayed on upper screen 13A, similarly to the image displayed by category display control unit 112 (refer to FIG. 11).

Here, contents available on distribution server 60 are continually updated. In a case that the category has a corresponding content as category B, it is necessary for the service provider to update the relationship between a content and a category when the content is newly added. Therefore, for a category corresponding to a content rarely updated, optimally the category corresponds to a content, as category B.

In a case that the search condition is set for a category as category A, the updated content includes a searched object. Therefore, there is no need to update the setting every time the content is updated. Therefore, for a category corresponding to a content that has been frequently updated, optimally the category corresponds to a search condition, as category A.

In a case that the displayed contents are changed in response to the category, the service provider can modify the search condition set for the category in configuration server 70 without setting the relationship between a content and a category for every content. Thus, the service provider or an administrator of the server can easily change the content to be displayed in response to the category.

The description is given referring to FIG. 9 again. As described above, content display control unit 116 and application display control unit 121 have a common function and differ in whether they belong to the searching function or the downloading function. In the following description, application display control unit 121 displays the application information image.

Application display control unit 121 displays on display module 13 the application information as shown in FIG. 12. Application selecting unit 122 waits (in step S220: NO) for an instruction by a user to select one item of application information (or content) with an application information image being displayed. Application selecting unit 122 selects (in step S220: YES) one item of application information (or content) based on an instruction by a user. Information display control unit 123 controls display module 13 to display (in step S230) related information corresponding to the selected application information. Hereinafter, the image shown in step S230 is referred to as an "application relation image."

Figure 13:
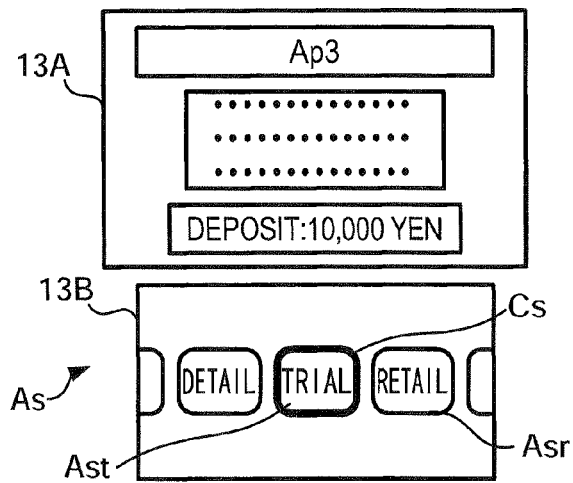
FIG. 13 shows an example of application relation image in game device 10.

FIG. 13 shows an example of the application relation image in game device 10. Information display control unit 123 displays on upper screen 13A a description for the selected application information (for example, a description shown in window Aw in FIG. 12). Information display control unit 123 displays on lower screen 13B icons As each showing retail version application program or trial version application program corresponding to the selected application information. It is to be noted that icons As may include an icon linking to a detailed description of the selected application information as well as icon Asr showing retail version application program and icon Ast showing trial version application program. Icon Asr is an icon to instruct downloading of the retail version application program. Icon Ast is an icon to instruct downloading of the trial version application program.

Referring to FIG. 9 again, download selecting unit 124 waits (in step S240: NO) for an instruction by a user to select one of the retail version application program and the trial version application program, with the image shown in FIG. 13 being displayed. Download selecting unit 124 selects (in step S240: YES) one of the retail version application program and the trial version application program based on an instruction by the user. If an application program is selected, payment processing unit 125 executes (in step S310) a process for paying a fee to download the application program. The process for paying the fee may be subtracting the fee from a deposit, or paying the fee by a credit card.

Receiving unit 126 receives (in step S410) an application program for which the fee has been paid. Mode selecting unit 127 displays (in step S420) on display module 13 an image for prompting a user to select a receiving mode. Hereinafter, the image displayed in step S420 is referred to as a "receiving mode selecting image."

FIG. 14 is an example of the receiving mode selecting image in game device 10. In lower screen 13B, a displayed button "YES" corresponds to the normal mode, and a displayed button "NO" corresponds to the background mode. Mode selecting unit 127 selects (in step S430) the receiving mode from among the normal mode and the background mode.

If the normal mode is selected (in step S430: YES), downloading unit 129 downloads (in step S440) an application program that is received by receiving unit 126. It is to be noted that during the download, switching the operation mode of game device 10 may be inhibited. Alternatively, if the operation mode of game device 10 is switched from the active mode to the sleep mode, game device 10 executes a process for stopping the download.

If the download by downloading unit 129 is completed (in step S450: YES), application storage module 130 stores (in step S460) the downloaded application program.

If the background mode is selected (in step S430: NO) or if the download by downloading unit 129 fails (in step S450: NO) because of, for example, deterioration of a connection between game device 10 and network 1000, downloading unit 129 registers (in step S470) the application program received by receiving unit 126 into a background download list (hereinafter referred to as a "BGDL list"). It is to be noted that, if the download is not completed, application storage module 130 may store a part of the application program. Further, the remaining part of the application program may be downloaded during the background downloading process.

If an instruction to download another application program is input after step S460 or S470 (in step S510: YES), the process transfers to step S110 again. If no instruction to download another application program and an instruction to terminate the operation is input (in step S510: NO) and if no application program is registered in the BGDL list (in step S520: NO), control unit 11 terminates the buying program.

If an application program is registered in the BGDL list (in step S520: YES), control unit 11 terminates the buying program and starts (in step S530) a BGDL program to start the BGDL process.

2-1. Background Downloading

Figure 15:
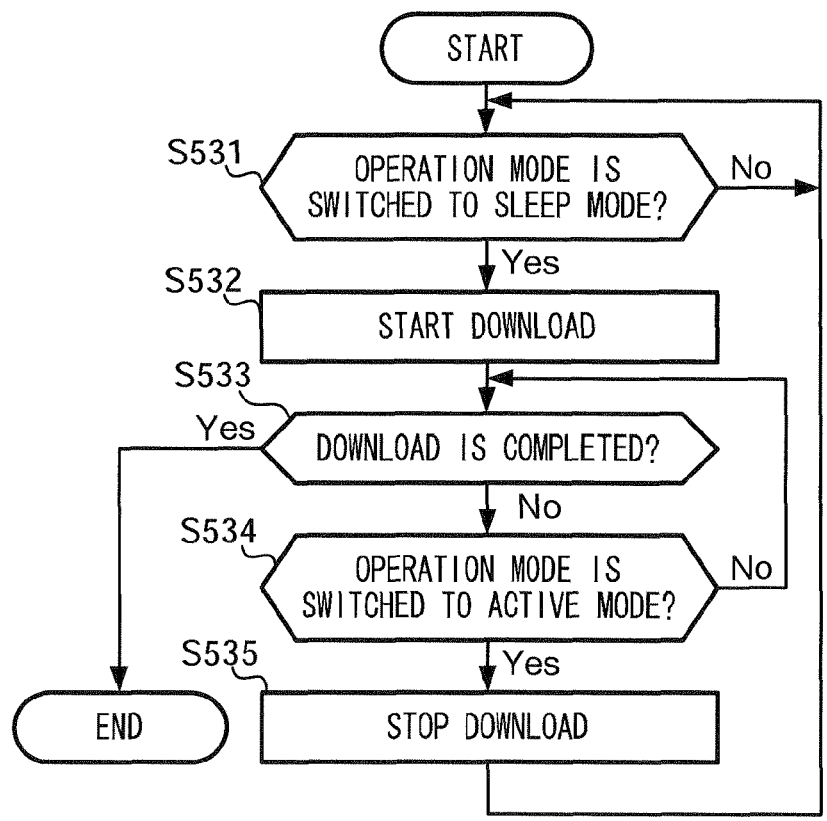
FIG. 15 shows an example of a flowchart illustrating background downloading.

FIG. 15 shows an example of a flowchart illustrating background downloading. According to the background downloading process, downloading unit 129 waits (in step S531: NO) for switching by switching unit 128 the operation mode from the active mode to the sleep mode. If the operation mode is switched to the sleep mode (in step S531: YES), downloading unit 129 starts downloading (in step S532) an application program registered in the BGDL list. If the download is not completed (in step S533: NO) or if the operation mode is not switched to the active mode (in step S534: NO), downloading unit 129 continues the download.

Downloading unit 129 may download application programs in an order appearing in the BGDL list, or in an order of priority determined by a predetermined algorithm. The algorithm may be, for example, an algorithm in which an application program that is instructed to start downloading in the normal mode but fails to complete the download has higher priority. Alternatively, the algorithm may be an algorithm in which the priority is determined based on data size.

If the download is completed (in step S533: YES), control unit 11 terminates the BGDL program. If the download is not completed (in step S533: NO) and the operation mode is switched to the active mode (in step S534: YES), downloading unit 129 stops (in step S535) downloading the application program and waits (in step S531: NO) for the operation mode to be switched to the sleep mode.

When downloading an application program, load on the CPU tends to increase. Therefore, in some cases, if a user inputs an instruction to game device 10, a response may be delayed because of the load. During the background downloading described above, an application program is downloaded during the sleep mode. Therefore, according to the background downloading, the load on the CPU caused by the download may be decreased compared with a case where an application program is downloaded during the active mode.

2-2. Transferring

Description will be given for a process for replacing the downloaded trial version application program with the retail version application program.

Figure 16:
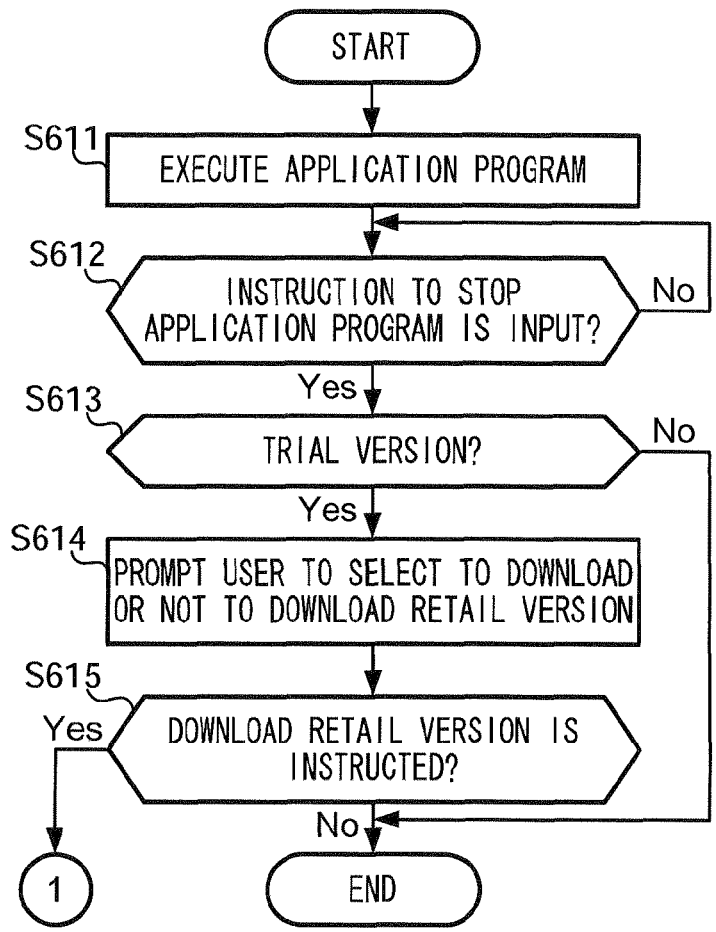
FIG. 16 shows an example of a flowchart illustrating transfer of data.

FIG. 16 shows an example of a flowchart illustrating the transfer process. First, executing unit 131 executes (in step S611) an application program stored in storage module 15. Execution control unit 132 waits (in step S612: NO) for an instruction by a user to stop the execution of the application program. If an instruction to stop the execution of the application program is input (in step S612: YES) and if the application program executed by executing unit 131 is the retail version application program (in step S613: NO), execution control unit 132 terminates the application program and the transfer. If the application program executed by executing unit 131 is the trial version application program (in step S613: YES), execution control unit 132 displays (in step S614) on display module 13 an image for prompting a user to select to download or not to download the retail version application program corresponding to the executed trial version application program. Hereinafter, the image shown in step S614 is referred to as a "confirmation image."

It is to be noted that, if the transfer is executed only when the trial version application program is executed, the process in step S613 may be omitted. Further, an instruction that triggers transferring the operation from step S612 to S613 may be an instruction other than the instruction to stop the execution of the application program, as long as it is a predetermined instruction.

Figure 17:
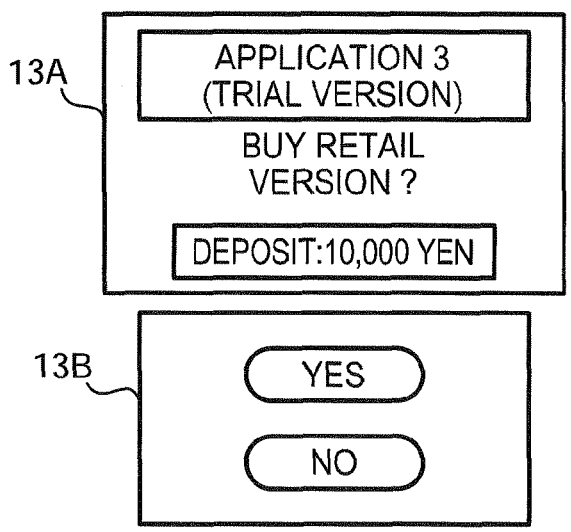
FIG. 17 shows an example of a confirmation image in game device 10.

FIG. 17 shows an example of the confirmation image in game device 10. If a button "NO" is selected by a user (in step S615: NO), execution control unit 132 controls executing unit 131 to terminate the execution of the trial version application program, and thereby terminates the transfer. If a button "YES" is selected by a user (in step S615: YES), execution control unit 132 starts the buying program and controls information display control unit 123 to display (in step S230) on display module 13 an image showing the related information of the application information corresponding to the trial version application program (refer to FIGS. 9 and 13). When displaying the image shown in FIG. 13 by information display control unit 123 under the control of execution control unit 132, cursor Cs may select an icon corresponding to the retail version application program. In such a case, execution control unit 132 may control executing unit 131 to terminate the execution of the trial version application program. Further, after the execution of the trial version application program is terminated, execution control unit 132 may display the confirmation image.

Further, if a button "YES" is selected (in step S615: YES), the process may transfer to step S310, a process for paying a fee for downloading the retail version application program.

As described above, a user using a trial version application program can easily buy a retail version application program, since an image (refer to FIG. 13) for prompting a user to buy the retail version application program is displayed. Further, since the related information of the application program is displayed, the user can confirm the related information.

3. Modifications

The embodiment described above may be modified as shown in the following. At least two modifications may be combined.

3-1. First Modification

At least a part of the downloading function shown in FIG. 8 may be omitted. For example, from among the downloading functions shown in FIG. 8, at least one of receiving unit 126, mode selecting unit 127, and switching unit 128 may be omitted. In such a case, downloading unit 129 may download an application program for which a fee has been paid by payment processing unit 125. In such a case, the receiving mode may be the normal mode. Alternatively, the receiving mode may be the background mode in a case that switching unit 128 is not omitted. In another example, payment processing unit 125 may be omitted. In such a case, downloading unit 129 may download an application program selected by download selecting unit 124.

3-2. Second Modification

The background downloading function may be independent from receiving unit 126, mode selecting unit 127, switching unit 128, and downloading unit 129. Alternatively, mode selecting unit 127 may be omitted. In such a case, an entire application program may be downloaded in the background mode.

A condition to trigger background downloading is not restricted to an example where the download is triggered by switching of the operation mode from the active mode to the sleep mode. For example, consider an example where a user inputs an instruction to download a second application program when a first application program is being executed in game device 10. In such a case, the second application program may be downloaded after the execution of the first application program is terminated. It is to be noted that the first application program may be the buying program described above. In the above-described embodiment, when the BGDL program is started (in step S530 in FIG. 9), control unit 11 terminates the buying program. However, in the second modification, the buying program is not terminated. Therefore, the BGDL program may be combined with another application program, for example, the buying program.

A description will be given for an example of the BGDL function and BGDL process according to the second modification.

Figure 18:
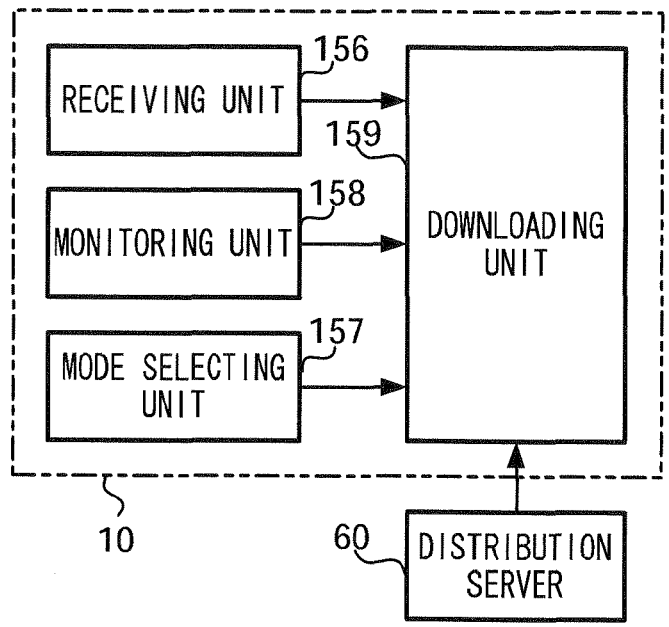
FIG. 18 shows an example of a function configuration relating to the BGDL function according to the second modification.

FIG. 18 shows an example of a function configuration relating to the BGDL function according to the second modification. In this example, game device 10 includes receiving unit 156, mode selecting unit 157, monitoring unit 158, and downloading unit 159. Receiving unit 156 and mode selecting unit 157 have similar functions to receiving unit 126 and mode selecting unit 127 in the above embodiment. Monitoring unit 158 monitors the application program (for example, the buying program) being executed when receiving unit 156 receives the identified data and determines whether the execution of the application program is terminated. Downloading unit 159 downloads to game device 10 the identified data received by receiving unit 156 from distribution server 60. If the normal mode is selected by mode selecting unit 157, downloading unit 159 downloads the identified data regardless of the execution state identified by monitoring unit 158. If the background mode is selected by mode selecting unit 157, downloading unit 159 restricts downloading of the identified data. In such a case, if the execution of the application program is terminated, downloading unit 159 starts downloading the identified data.

It is to be noted that, if an application program is started before the download of the identified data is completed, the started application program will be monitored by monitoring unit 158. Further, downloading unit 159 stops (or restricts) the download.

Figure 19:
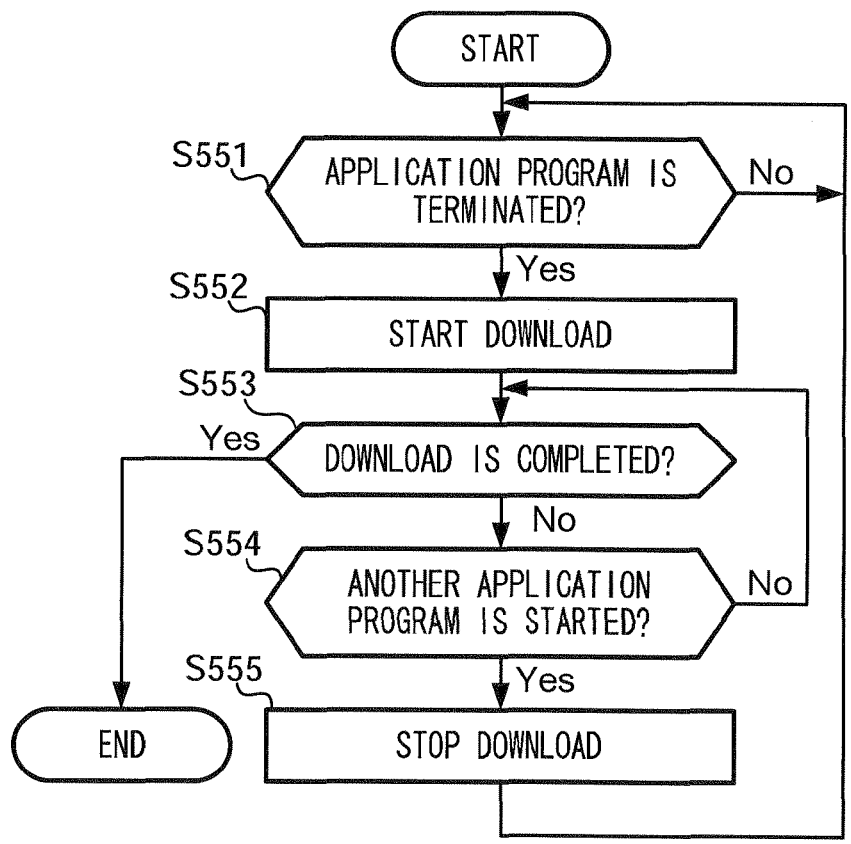
FIG. 19 shows an example of the BGDL process according to the second modification.

FIG. 19 shows an example of the BGDL process according to the second modification. Monitoring unit 158 monitors (in step S551) the execution status of the application program. If the execution of the application program is terminated (in step S551: YES), downloading unit 129 starts (in step S552) downloading the identified data (for example, an application program) registered in the BGDL list. If the download is not completed (in step S553: NO) and if another application program is not started (in step S554: NO), downloading unit 129 continues to download.

If the download is completed (in step S553: YES), control unit 11 terminates the BGDL program. If the download is not completed (in step S553: NO) and if another application program is started (in step S554: YES), downloading unit 129 stops (in step S555) the download. In such a case, the started application program is monitored by monitoring unit 158. Monitoring unit 158 monitors (in step S551) the execution of the application program.

According to the second modification, the load of the CPU caused by the download is inhibited.

3-3. Third Modification

Plural items of application information may correspond to a single trial version application program. In such a case, in step S614 in FIG. 16, the confirmation image may be an image for prompting a user to select one item of the application information. Further, execution control unit 132 may control information display control unit 123 to display (in step S230 in FIG. 8) on display module 13 the related information corresponding to the selected item of the application information.

3-4. Fourth Modification

According to the embodiment, mode selecting unit 127 selects a mode for the download based on an instruction by a user. However, mode selecting unit 127 may select the mode based on an attribute of the identified data. In other words, mode selecting unit 127 may select a mode that is independent from an instruction by a user. Here, the attribute of the identified data may be an amount of data (or data size) or a type of data. For example, in a case that a data size is used as the attribute, mode selecting unit 127 may select the background mode if the data size of the identified data is greater than or equal to a threshold. Further, mode selecting unit 127 may select the normal mode if the data size of the identified data is less than the threshold. As another example, in a case that a type of data is used as the attribute, mode selecting unit 127 may select the background mode if the identified data is a program. Further, mode selecting unit 127 may select the normal mode if the data is other than a program.

3-5. Fifth Modification

According to the embodiment, downloading unit 129 starts the download if the operation mode is switched from the active mode to the sleep mode. However, downloading unit 129 may continue to restrict the download even if the operation mode is switched from the active mode to the sleep mode, in response to a status of game device 10 in the active mode. For example, if a specific application program is executed in the active mode and the operation mode is switched to the sleep mode during the execution of the specific application program, downloading unit 129 continues to restrict the download. If a specific application program is not executed in the active mode and the operation mode is switched to the sleep mode during the execution of the specific application program, downloading unit 129 starts the download.

3-6. Sixth Modification

Distribution server 60 may store in storage module 65 as cache information the search condition received by search condition receiving unit 611 and the search results transmitted from search result transmitting unit 614 along with the relationship thereof. In such a case, if the search condition received by search condition receiving unit 611 is stored, search result transmitting unit 614 transmits search results corresponding to the search condition, instead of the search results obtained by searching unit 613. If a search condition is identical with a search condition previously received, there is no need for searching unit 613 to search again. Therefore, according to this example, a response time may be shorter.

It is to be noted that if a content downloadable on distribution server 60 is updated, the cached information may be deleted. In such a case, information newly received after the deletion may be stored as the cached information.

Information-processing system 1 may define version information showing a version of a content downloadable on distribution server 60, and the version information may be added to the cache information. In such a case, older cache information may be maintained to be stored along with the version information. Further, in such a case, the configuration information stored in configuration server 70 may be stored along with the version information.

When transmitting a search condition, search condition transmitting unit 114 transmits the version information along with the corresponding search condition. If an item of cache information with which the version information is stored is included in the cache information corresponding to the search condition, distribution server 60 transmits to game device 10 the search results corresponding to the item of the cache information. If no item of cache information with which the version information is stored is included in the cache information corresponding to the search condition, distribution server 60 searches, using searching unit 613, and transmits the search results to game device 10. Further, distribution server 60 adds the version information to the item of cache information corresponding to the search results.

3-7. Seventh Modification

In the embodiment, category receiving unit 111 receives the configuration information stored in category storage unit 712. However, category receiving unit 111 receives only information relating to the category and may not receive the set search condition. In such a case, transmitting unit 114 may transmit to distribution server 60 a search condition set for the category that is received from configuration server 70.

3-8. Eighth Modification

With regard to the configuration information, a location of a displayed image relating to each category as shown in FIG. 11 may be set for each category. The location may be absolute or may be a relative positional relationship. In such a case, category display control unit 112 controls display module 13 to display images relating to the categories based on the positions set for the categories.

With regard to configuration information, a location of a displayed image relating to the application information as the search results as shown in FIG. 12 may be defined by the configuration information. In such a case, the location may be defined as, for example, an order of arrival, a number of downloads, or points awarded by users. Further, the location of the displayed image may be determined based on the meta data stored in distribution server 60. For example, in a case that the location of the displayed image is determined in order of arrival, the publication date in the meta data is referred to. The location is determined so that an item of the application information having the latest publication data comes first. In such a case, content display control unit 116 displays on display module 13 the application information image.

It is to be noted that category storage unit 712 adds the stored configuration information to a history of the configuration information in a case that the configuration information and the search condition are updated by setting unit 711. When receiving from configuration server 70 a search condition set for the category, search condition transmitting unit 114 may receive a search condition that is set for the category related to the category information, which category receiving unit 111 receives.

To the history of the configuration information, identification information showing a time when the history is made is added, so as to identify an item of the configuration information that was used when the category information was received by category receiving unit 111. The item of the configuration information used when the category information was received may be identified by another method. For example, version information may be added to the configuration information and the version information may be obtained when the category information is received. According to the example, if the search condition is set for a category after the category information is received, a game device can receive an older version of the search condition.

3-9. Ninth Modification

According to the above embodiment, category selecting unit 113 selects a category based on an input by a user via input module 12. However, category selecting unit 113 may select a category that is independent from an input by a user. In such a case, category selecting unit 113 automatically selects a category in accordance with a predetermined algorithm. Search result receiving unit 115 may store search results corresponding to each category prior to the search. Further, content display control unit 116 may display the application information corresponding to the selected category after the category is selected.

In other words, game device 10 controls distribution server 60 to search and obtain the search results, prior to an instruction by a user. Therefore, in a case that the user takes a time to select a category, a time to display the application information image can be shorter.

3-10. Tenth Modification

According to the embodiment, mode selecting unit 127 prompts a user to select a receiving mode when downloading an application program for which a payment process has been completed. However, mode selecting unit 127 may prompt a user to select a receiving mode before the payment process is completed. Details are as follows.

Figure 20:
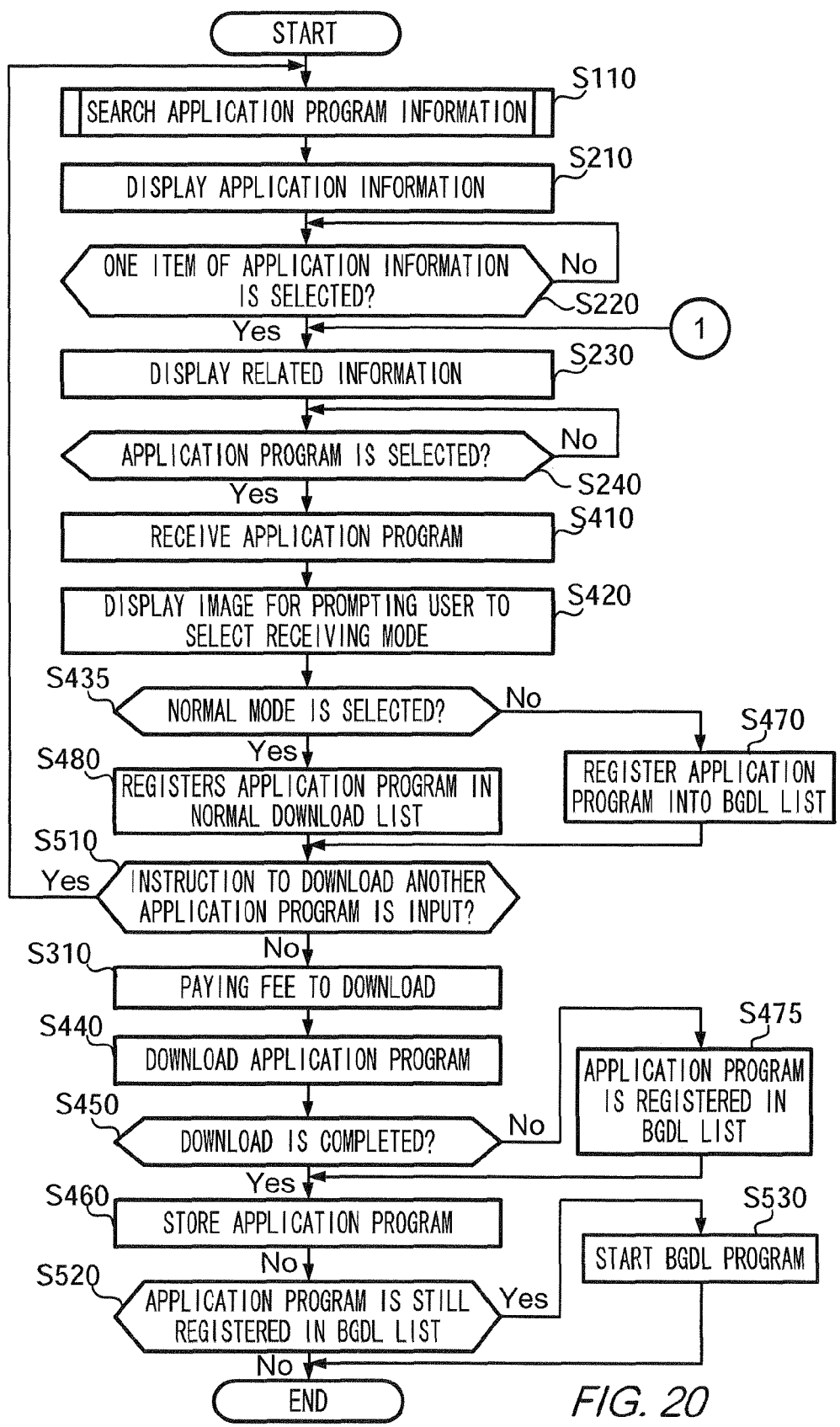
FIG. 20 shows an example of a flowchart illustrating a process for buying a content according to the tenth embodiment.

FIG. 20 shows an example of a flowchart illustrating a process for buying a content according to the tenth embodiment. Processes in steps S110 to S240 are identical with those of the above embodiment. Therefore, descriptions of these steps are omitted. In the following description, the same numeric references are used for elements common with those of the above embodiment.

After an application program is selected in step S240, receiving unit 126 receives (in step S410) the selected application program. Then, mode selecting unit 127 controls display module 13 to display (in step S420) the receiving mode selecting image (refer to FIG. 14). Mode selecting unit 127 selects (in step S435) the normal mode or the background mode based on an instruction by a user. If the normal mode is selected (in step S435: YES), downloading unit 129 registers (in step S480) into a normal download list the application program received by receiving unit 126. If the background mode is selected (in step S435: NO), downloading unit 129 registers (in step S470) into the BGDL list the application program received by receiving unit 126.

If an instruction to download another application program is input (in step S510: YES), the process transfers to step S110. If an instruction to download another application program is not input and an instruction to terminate the application program is input (in step S510: NO), payment processing unit 125 executes (in step S310) a process for paying a fee to download an application program registered in the normal download list and/or the BGDL list.

If the process for paying the fee is completed, downloading unit 129 downloads (in step S440) an application program registered in the normal download list. If the download of the application program fails to complete (in step S450: NO), the application program is registered (in step S475) in the BGDL list. If the download of the application program is completed (in step S450: YES), application storage module 130 stores (in step S460) the application program.

If no application program is registered in the BGDL list (in step S520: NO), control unit 11 terminates the buying program. If an application program is still registered in the BGDL list (in step S520: YES), control unit 11 terminates the buying program and starts (in step S530) the BGDL program.

As described above, when downloading application programs, a user selects the normal mode or the background mode for each application program. After the process for paying the fee is completed, the application programs are downloaded in corresponding receiving mode.

What is claimed is:

1. An information-processing device comprising a computer configured to perform at least:
    switching an operating mode of the information-processing device to an active mode or a sleep mode;
    receiving, when the information-processing device is in the active mode, an instruction to download data specified by a user; and
    start download of the data responsive to switching the operating mode of the information-processing device from the active mode to the sleep mode,
    selecting a first mode or a second mode, the first mode being a mode in which the data is downloaded in the active mode, the second mode being a mode in which the data is downloaded in the sleep mode, in a case that the second mode is selected, the computer is further configured to restrict the download of the data in the active mode and start the download of the data when the operating mode of the information-processing device switches from the active mode to the sleep mode, and in a case that the first mode is selected, the computer is further configured to start the download of the data in the active mode, wherein the computer is further configured to receive instructions to download a plurality of items of the data, the computer is further configured to select the first mode or the second mode, for each of the plurality of items of the data, and the computer is further configured to start download of an item of the data after it completes receiving the instruction to download the item of the data.

2. The information-processing device according to claim 1, wherein the computer is further configured to select the first mode or the second mode, based on an instruction by a user via an input unit that receives the instruction by the user.

3. The information-processing device according to claim 1, wherein the computer is further configured to select the first mode or the second mode, based on an attribute of the data.

4. The information-processing device according to claim 1, wherein the computer is further configured to restart the download of the data after the operating mode is switched to the sleep mode, in a case that the download of the data fails to complete in the active mode.

5. The information-processing device according to claim 1, wherein if the computer receives a plurality of instructions to download a plurality of items of the data, the computer is further configured to start download of the data after the operating mode is switched from the active mode to the sleep mode.

6. The information-processing device according to claim 1, wherein the computer is further configured to:

restrict the download of the data if the operating mode switches from the sleep mode to the active mode; and restart the download of the data if the operating mode switches from the active mode to the sleep mode.

7. The information-processing device according to claim 6, wherein the computer is further configured to maintain restricting the download of the data in a case that a specific program is executed in the active mode, even if the operating mode is switched from the active mode to the sleep mode.

8. The information-processing device according to claim 1, further comprising:

a body that is able to open and close, wherein the computer is further configured to receive the instruction when the body is opened, and the computer is further configured to switch the operating mode to the active mode when the body is opened, and to the sleep mode when the body is closed.

9. An information-processing device comprising a computer configured to perform at least:

monitoring an execution status of an application program;

receiving an instruction to download a plurality of data items specified by a user when the application program is executed;

start download of the plurality of data items when the application program is stopped, and to restrict the download when the application program is executed, wherein the computer is further configured to perform:

selecting a first mode or a second mode, for each of the plurality of data items, after issuing a prompt to a user to select the first or the second mode, the first mode being a mode in which the plurality of data items are downloaded when the application program is executed, the second mode being a mode in which the plurality of data items are downloaded when the application program is stopped, wherein the computer is further configured to:

restrict the download when the application program is executed, and start the download of the plurality of data items when the execution status of the application program is switched from executing to stopped, if the second mode is selected; and start the download of the plurality of data items when the application program is executed, if the first mode is selected.

10. The information-processing device according to claim 9, wherein the computer is further configured to select the first mode or the second mode based on an input by a user via the receiving unit.

11. The information-processing device according to claim 9, wherein the computer is further configured to select the first mode or the second mode based on an attribute of the data.

12. The information-processing device according to claim 9, wherein, the computer is further configured to restart the download of the data after the application program is stopped in a case that the download of the data fails to complete when the application program is executed.

13. An information-processing system comprising:

an information-processing device, and a server, wherein the server includes a memory configured to store data, and the information-processing device includes a computer configured to perform at least:

switching an operating mode of the information-processing device to an active mode or a sleep mode;

receiving, when the information-processing device is in the active mode, an instruction to download data specified by a user; and start download of the data responsive to switching the operating mode of the information-processing device from the active mode to the sleep mode, selecting a first mode or a second mode, the first mode being a mode in which the data is downloaded in the active mode, the second mode being a mode in which the data is downloaded in the sleep mode, in a case that the second mode is selected, the computer is further configured to restrict the download of the data in the active mode and start the download of the data when the operating mode of the information-processing device switches from the active mode to the sleep mode, and in a case that the first mode is selected, the computer is further configured to start the download of the data in the active mode, wherein the computer is further configured to receive instructions to download a plurality of items of the data, the computer is further configured to select the first mode or the second mode, for each of the plurality of items of the data, and the computer is further configured to start download of an item of the data after it completes receiving the instruction to download the item of the data.

14. An information-processing system comprising:
an information-processing device, and
a server, wherein
the server includes
a memory configured to store data, and
the information-processing device includes a computer configured to perform at least:

monitoring an execution status of an application program;
receiving an instruction to download a plurality of data items specified by a user when the application program is executed;
start download of the plurality of data items when the application program is stopped, and to restrict the download when the application program is executed, wherein
the computer is further configured to perform
selecting a first mode or a second mode, for each of the plurality of data items, after issuing a prompt to a user to select the first or the second mode, the first mode being a mode in which the plurality of data items are downloaded when the application program is executed, the second mode being a mode in which the plurality of data items are downloaded when the application program is stopped, wherein
the computer is further configured to:
restrict the download when the application program is executed, and start the download of the plurality of data items when the execution status of the application program is switched from executing to stopped, if the second mode is selected; and
start the download of the plurality of data items when the application program is executed, if the first mode is selected.

15. An information-processing method comprising:
receiving, when an operating mode of an information-processing device is an active mode, an instruction to download data specified by a user; and
starting download of the data responsive to switching the operating mode of the information-processing device from the active mode to a sleep mode,
selecting a first mode or a second mode, the first mode being a mode in which the data is downloaded in the active mode, the second mode being a mode in which the data is downloaded in the sleep mode,
in a case that the second mode is selected, restricting the download of the data in the active mode and starting the download of the data when the operating mode of the information-processing device switches from the active mode to the sleep mode, and
in a case that the first mode is selected, starting the download of the data in the active mode,
receiving instructions to download a plurality of items of the data,
selecting the first mode or the second mode, for each of the plurality of items of the data, and
starting download of an item of the data after completing receiving the instruction to download the item of the data.

16. An information-processing method comprising:
monitoring an execution status of an application program;
receiving an instruction to download a plurality of data items specified by a user when the application program is executed;
restricting the download when the application program is being executed; and
starting download of the plurality of data items when the application program is stopped, the method further comprising:
selecting a first mode or a second mode, for each of the plurality of data items, after issuing a prompt to a user to select the first or the second mode, the first mode being a mode in which the plurality of data items are downloaded when the application program is executed, the second mode being a mode in which the plurality of data items are downloaded when the application program is stopped;
restricting the download when the application program is executed, and starting the download of the plurality of data items when the execution status of the application program is switched from executing to stopped, if the second mode is selected; and
starting the download of the plurality of data items when the application program is executed, if the first mode is selected.

17. A computer-readable non-transitory storage medium storing a program causing a computer device to execute a process, the process comprising:
receiving, when an operating mode of an information-processing device is an active mode, an instruction to download data specified by a user; and
starting download of the data responsive to switching the operating mode of the information-processing device from the active mode to a sleep mode,
selecting a first mode or a second mode, the first mode being a mode in which the data is downloaded in the active mode, the second mode being a mode in which the data is downloaded in the sleep mode,
in a case that the second mode is selected, restricting the download of the data in the active mode and starting the download of the data when the operating mode of the information-processing device switches from the active mode to the sleep mode, and
in a case that the first mode is selected, starting the download of the data in the active mode,
receiving instructions to download a plurality of items of the data,
selecting the first mode or the second mode, for each of the plurality of items of the data, and
starting download of an item of the data after completing receiving the instruction to download the item of the data.

18. A computer-readable non-transitory storage medium storing a program causing a computer device to execute a process, the process comprising:
monitoring an execution status of an application program;
receiving an instruction to download a plurality of data items specified by a user when the application program is executed;
restricting the download when the application program is being executed; and starting download of the plurality of data items when the application program is stopped, the method further comprising:

selecting a first mode or a second mode, for each of the plurality of data items, after issuing a prompt to a user to select the first or the second mode, the first mode being a mode in which the plurality of data items are downloaded when the application program is executed, the second mode being a mode in which the plurality of data items are downloaded when the application program is stopped;

restricting the download when the application program is executed, and starting the download of the plurality of data items when the execution status of the application program is switched from executing to stopped, if the second mode is selected; and starting the download of the plurality of data items when the application program is executed, if the first mode is selected.

* * * * *